Feb. 26, 1957 H. ROHLING ET AL 2,782,999
DEVICE FOR WINDING MAGNETIC SOUND RECORDING TAPE OR WIRE
Filed Jan. 14, 1954
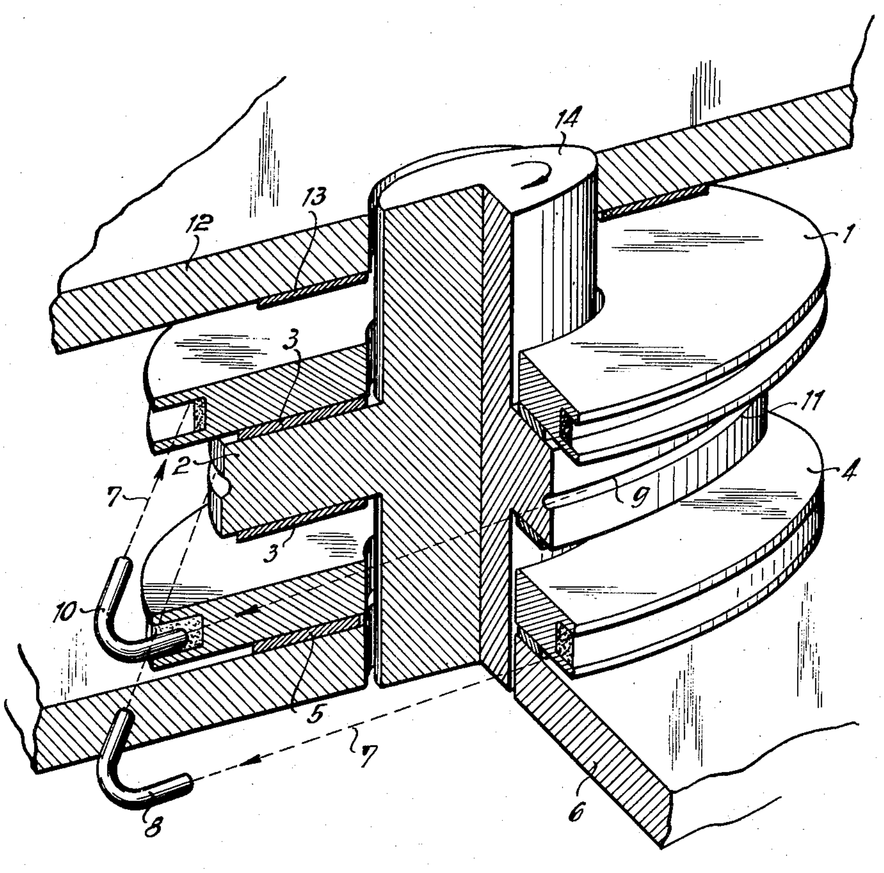
INVENTORS
Hermann Rohling
Richard Siegemund
by Stevens, Davis, Miller & Mosher
their attorneys 2,782,999
Patented Feb. 26, 1957

2,782,999

DEVICE FOR WINDING MAGNETIC SOUND RECORDING TAPE OR WIRE

Hermann Rohling, Oberdorf, near Immenstadt, Allgau, and Richard Siegemund, St. Georgen, Black Forest, Germany Application January 14, 1954, Serial No. 404,032

Claims priority, application Germany January 16, 1953

5 Claims. (Cl. 242—54)

The known magnetic sound recording and reproducing apparatus operating with sound recording medium in the form of tape or wire are attended by a number of disadvantages which render the use of such apparatus by inexperienced operators very difficult and sometimes impossible. More especially, difficulties arise when exchanging the reels carrying the recording media and when removing or fitting the recording medium on the recording or reproducing head; the danger then exists that, with inexpert handling, the recording medium may become entangled or broken, especially when thin wire is employed as recording medium, thin wire, in spite of its comparative fragility, being an advantageous recording medium, as a greater length can be wound on reels of a given size, as compared with tapes or wires of a larger cross-sectional area.

Numerous attempts have already been made to facilitate the unwinding and winding-back of the recording medium and the exchange of reels carrying the recording medium. Thus, it is already known to combine the take-up and supply reels in one housing and to drive only the take-up reel, thus drawing the recording medium off the supply reel past the recording and reproducing heads. It is also known to dispose reels round which the recording medium is wound in its path between the take-up reel and the supply reel, and in some cases to employ the capstan adjacent the recording head to drive the recording medium. With these known devices, the reels are removable and rewinding can be effected on the same device by changing over the two reels.

In contrast with the known arrangements, the present invention provides a device in which the two reels are mounted for rotation within a housing, and in which the direction of movement of the tape or wire is reversed by turning the device over, the coupling of the reel which is to act as take-up reel to the driving mechanism being effected by the action of gravity.

In one form of the invention, the device may include two driving shafts adapted to be driven together from outside the housing and means for coupling each of the reels to be driven by a respective one of the shafts, the arrangement being such that, on movement of the device into one position from its inverted position, the action of gravity causes the first of the reels to become coupled to the first shaft so as to be driven thereby, and the second of the reels to become decoupled from the second shaft, whilst, on movement of the device from the said one position to its inverted position, the action of gravity causes the first of the reels to become decoupled from the first shaft and the second of the reels to become coupled to the second shaft so as to be driven thereby. It is often convenient for opposite surfaces of the housing each to have at least one of the shafts projecting therethrough so that the shafts may be driven directly from a rotating member outside the housing.

In order to drive the appropriate reel, which is to act as the take-up reel, the first reel may be mounted on the first shaft so that it can rotate and slide relatively thereto, and the second reel may be similarly mounted on the second shaft, a radial projection being located on each shaft, so that, in the one position of the device the first reel is in contact with the projection on the first shaft and the second reel is out of contact with the projection on the second shaft whilst, on rotation of the device to the inverted position, the reels slide along their respective shafts, so that the first reel is then out of contact with the projection on the first shaft and the second reel is then in contact with the projection on the second shaft. The projections may be in the form of circular discs fixed to, or integral with the shafts, the sound recording tape or wire passing from one reel round each of the discs to the other reel; it will readily be appreciated that in this way the device may be so constructed (in particular, by making the discs of smaller diameter than the reels) that the speed of the tape or wire is governed by the speed of the discs, and is therefore constant if the speed of the discs is constant irrespective of the quantity of tape or wire on the take-up reel. The recording can then suitably be made on the recording medium as it passes over one of the discs, an aperture being provided in the casing at a suitable position in order to allow a magnetic recording head to be inserted adjacent the periphery of one of the discs.

In a preferred form of the invention, however, there is only one driving shaft, this driving shaft being adapted to be driven from outside the housing and preferably having its ends projecting through opposite surfaces of the housing for this purpose. Where there is only one driving shaft, means are provided for coupling each of the reels to be driven by the shaft, the arrangement being such that, on movement of the device into one position from its inverted position, the action of gravity causes the first of the reels to become coupled to the shaft so as to be driven thereby, and the second of the reels to become decoupled from the shaft, whilst, on movement of the device from the said one position to its inverted position, the action of gravity causes the first of the reels to become decoupled from the shaft and the second of the reels to become coupled to the shaft so as to be driven thereby.

One embodiment of the preferred form of the invention will now be described with reference to the accompanying drawing, which is a perspective view of the device with parts broken away to show certain details more clearly. It is not thought necessary to illustrate the form of the invention in which the device has two driving shafts, since the construction of such a device will be readily apparent to these skilled in the art, after reading the following description.

Referring now to the drawing, the device embodies a horizontally disposed casing having vertically spaced top and bottom members 6, 12 (the casing is reversible so that the members 6 and 12 will alternately be the top and bottom of the casing, but in the drawing the member 12 is shown at the top). The side walls of the casing are not shown. A vertical shaft 14 is journalled in holes in the top and bottom members, and has a central disc 2 fixed to, or integral therewith (in the drawing the disc 2 is shown as being integral with the shaft 14). Above and below the disc 2 are located two reels 1 and 4 made of light metal and each loosely mounted so that they can rotate and slide relatively to the shaft 14. The disc 2 has secured to its upper and lower surfaces an annular piece 3 of velvet to increase the friction between the disc and the upper reel. Under the action of gravity the upper reel, which acts as the take-up reel, rests on the disc 2, and the lower reel rests on the inner surface of the housing. An annular friction disc 5, made of paper, is provided on the inner surface of the member 6, and a similar disc 13 is provided on the member 12.

The nature of the various friction materials (the velvet 3 on the one hand and the paper 5 and 13 on the other) is such that the friction between the upper reel and the disc 2 is greater than that between the lower reel and the inner surface of the housing.

A guide 8 in the form of a narrow tube, which may be of glass, or a friction resistant plastic material, guides the recording medium (in this case recording wire indicated by the broken line 7) from the reel 4 to a groove 9 in the disc 2. The wire 7 passes around about two-thirds of the circumference of the disc 2 in the groove 9 and then through another fixed guide 10 (also in the form of a narrow tube) to the reel 1.

The recording head (not shown) which carries the recording, reproducing and/or erasing magnets, is introduced through an aperture (not shown) into the housing, so that it bears under light pressure against the recording wire 7, for example at the point 11. This pressure may be equal to about 3 grams.

The diameter of the disc 2 is smaller than the diameter of the reels 1 and 4 on which the wire is wound, so that the wire is in tension between the take-up reel and the disc, the amount of tension being of course partly influenced by the degree of friction between the take-up reel and the disc 2.

The device with the wire therein may be regarded as a cassette which can be used repeatedly without any necessity for the user to have access to the reels or to the wire. In fact, the magnetic recording head and the aperture therefor can be made so narrow, that the recording wire cannot be reached with the finger at this point.

In order to operate the cassette, it may be mounted on the turntable of a record playing mechanism in such manner that the lower end of the shaft 14 is driven by the turntable through a coupling member which fits over the central projection on the turntable and grips the shaft 14, which is extended outwardly beyond the position shown in the drawing to enable this to be done. The casing of the device is held stationary, the magnetic head is applied to the point 11 on the disc 2 through the aforementioned aperture, and the shaft 14 is set in rotation, in the direction indicated, by starting the turntable driving mechanism. The said shaft drives the take-up reel 1 through the disc 2, the said take-up reel drawing the recording wire from the supply reel 4 loosely mounted on the shaft 14 and guiding it around the groove 9. When the recording wire is to be wound back, the cassette is inverted, so that the upper end of the shaft 14 and the coil on the reel 1 lie lowermost, while the reel 4, which is now the upper (i. e. the take-up) reel falls on to the disc 2 and is coupled therewith. At the same time, the reel 1 falls on to the paper disc 13. The re-winding is effected in exactly the same manner as the winding-on, the user having only to turn the cassette through 180°.

It is also possible to operate two or more cassettes simultaneously by laying a second cassette on the first cassette which is already on the turntable, so that the two shafts 14 are in engagement with one another, a simple intermediate coupling being employed between the shafts for this purpose. The recording medium can then be wound from one reel on to the other reel in the upper cassette while recording or reproduction is being effected on or from the recording medium in the lower cassette.

The cassette illustrated and described is particularly suitable for operation by unskilled persons. By suitably dimensioning the disc 2 so that it is only slightly smaller than the outside circumference of the reels 1 and 4 on which the recording wire is wound, the tension in the recording wire can be made very small, this resulting in a good adhesion to the disc 2 and permitting the use of very thin wire, for example austenitic steel less than 0.05 mm. in diameter. The use of very thin wire permits the use of a frequency range up to 12,000 cycles per second even at low feed speeds of, for example, 19 cm. per second, and, owing to the small volume of the coil of recording wire, coils of wire which permit a playing time of two hours or more are practicable.

Owing to the compact nature of the cassette, it is possible to employ a novel erasing method. For example, a recording of two hours and more may be erased, and the whole playing capacity made ready for further recording, by bringing the entire cassette for a brief time into the magnetic field of an air-core coil fed with alternating current, whereby the existing magnetic recording on the recording wire is removed. It is immateral whether the take-up and supply reels are partially wound with recording wire or the wire has been wound to the end.

What we claim and desire to secure by Letters Patent is:

1. A reel assembly for a magnetic recording medium comprising a horizontally disposed housing having vertically spaced top and bottom walls, a shaft rotatably mounted in the housing between the top and bottom walls, a disc fixed to said shaft, friction elements secured to opposite horizontally disposed faces of said disc, and braking elements located vertically and axially spaced from said disc on opposite sides thereof, a pair of reels centrally mounted loosely on said shaft to be rotatable and slidable vertically relative thereto, said reels being mounted on said shaft on opposite sides of said disc between said disc and said braking material, so that when the housing is in one horizontal position, one of the reels will, by gravity, be in frictional engagement with one of said friction elements for rotation with the shaft and the other reel will be in engagement with one of said braking elements, while in the inverted horizontal position the one reel will engage one of the braking elements while the other reel will engage one of the friction elements.

2. A reel assembly as defined in claim 1 wherein said friction elements are constituted by velvet and said braking elements are constituted by paper.

3. A reel assembly as defined in claim 1 wherein said braking elements are secured to the inner surfaces of the top and bottom walls of said housing.

4. A reel assembly as claimed in claim 1, wherein said disc is of a smaller diameter than the reels and is provided with a circumferential annular groove to receive the recording medium.

5. A reel assembly as claimed in claim 1, wherein guide means are provided for guiding the recording medium from one reel around the disc to the other reel, said guide means comprising a curved tube to guide said recording medium from the plane of one reel to the plane of the disc and a second curved tube to guide the recording medium from the disc to the other reel.

References Cited in the file of this patent

UNITED STATES PATENTS

| | | |
|---|---|---|
| 1,499,521 | Hagemann | July 1, 1924 |
| 2,463,001 | Shrader | Mar. 1, 1949 |
| 2,507,385 | Shrader | May 9, 1950 |
| 2,557,012 | Shrader | June 12, 1951 |
| 2,568,601 | Anderson | Sept. 18, 1951 |